Patented Jan. 13, 1942

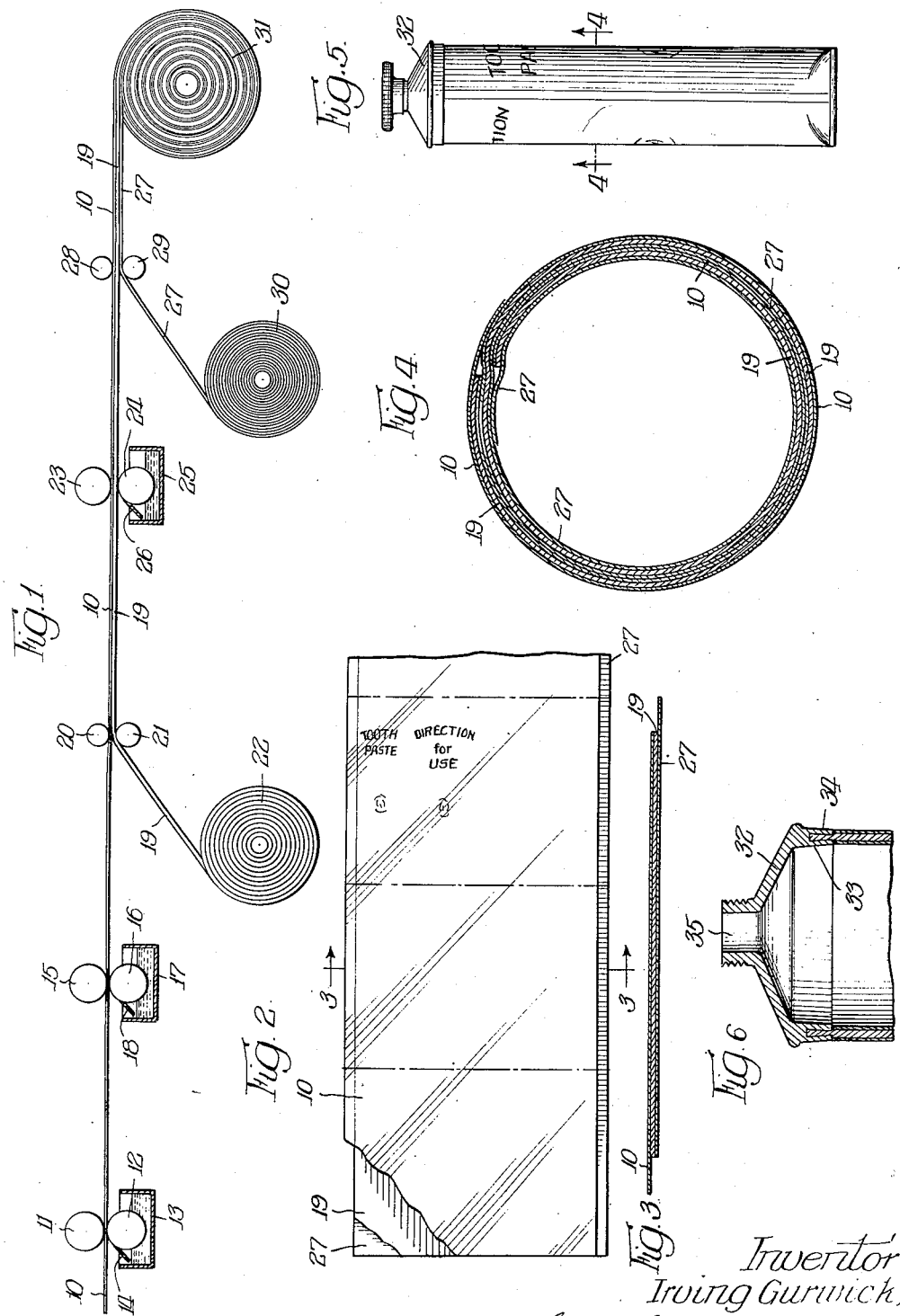

2,269,661

UNITED STATES PATENT OFFICE 2,269,661

LAMINATED DISPENSING TUBE AND METHOD OF MAKING SAME

Irving Gurwick, Mount Vernon, Ohio, assignor to Shellmar Products Company, Mount Vernon, Ohio, a corporation of Delaware Application April 8, 1938, Serial No. 200,868
Renewed March 1, 1940

10 Claims. (Cl. 154—2)

The present invention relates to the formation of dispensing containers and refers in particular to an improved material such as may be employed in the production of tooth paste tubes and the like.

A principal object of the invention is the formation of dispensing containers of the type described herein from laminated sheet materials which are wound into a tube and adhesively secured in convoluted form.

An additional object is the production of tubes by laminating a sheet of metal foil to interior and exterior sheets of organic non-fibrous materials and winding the composite web into tube form.

Still another object is to produce dispensing tubes by laminating metallic foil or other moisture-resistant sheet material with a preformed interior web of transparent rubber compound and a decorated exterior web of non-fibrous cellulose sheeting such as cellulose acetate and fabricating the composite web into tube form.

A further object is to form a tube by providing a central protective web such as metal foil with an interior web of rubber hydrochloride having an exposed end extension and an exterior web of decorated cellulose acetate having an opposite end extension, winding the composite web into tube form with the rubber hydrochloride extension overlapping the web of rubber hydrochloride and being sealed thereto and the cellulose acetate extension overlapping the web of cellulose acetate and being sealed thereto.

These and other objects will be evident upon a consideration of the following description of a preferred embodiment of the invention and by reference to the accompanying drawing, in which:

Fig. 1 is a diagrammatic view illustrating the method of forming the tube material;

Fig. 2 is a view of the exterior of the composite web formed by the method of Fig. 1;

Fig. 3 is a sectional view taken along line 3—3 of Fig. 2;

Fig. 4 is a cross-sectional view of a tube formed from the material of Figs. 2 and 3 and is taken along line 4—4 of Fig. 5;

Fig. 5 is a view of a completed dispensing tube with head attached and ready for filling; and Fig. 6 is a sectional view showing the attachment of the tube to a head portion.

Dispensing tubes of the type used almost universally heretofore are produced by extrusion of a metal in tube form. Such tubes are expensive and are difficult to decorate so as to make the completed article attractive from the sales standpoint. In accordance with the present invention an improved tube is provided which is economical and highly attractive.

As shown in Fig. 1, a web 10 of transparent cellulose acetate is passed through an intaglio printing device which provides on the under side of the web a decorative and preferably multicolor design of a quick-drying intaglio ink. This device is represented in the drawing by a single intaglio unit composed of an upper impression roller 11, an etched printing roller 12, a color bath 13 containing a quick-drying lacquer ink, and a doctor blade 14. Normally, the design will be multicolor and deposited by a plurality of such units, as described in my Patent No. 1,867,314, issued July 12, 1932.

After passing through the design-applying unit the web 10 then passes through another intaglio unit consisting of an upper impression roll 15, an etched cylinder 16, a bath 17 and a doctor blade 18. Cylinder 16 differs from cylinder 12 in that it has an overall etch, save for end bearing portions upon which the doctor blade rides, and deposits an overall coating upon the under side of the cellulose acetate web. This coating is uniform and of an adhesive nature. It may be of similar composition to the ink contained in the first color unit or may differ therefrom as required to produce the desired results. Preferably, the adhesive deposited by cylinder 16 forms a background color for the design previously printed on the web. The color may be white or any other solid opaque pigment.

After passing through the adhesive-applying unit the web 10 is contacted with a web 19 of metallic foil, this preferably being accomplished between the rollers 20 and 21 which exert sufficient pressure between the two webs to insure adequate adhesion. The web 19 is unwound from a roll 22 which may be mounted in the same machine as the color units. The point of contact between the two webs is adjusted so that a good portion of the solvent present in the adhesive applied by cylinder 16 has evaporated and the adhesive coating has retained its tacky nature.

The composite web then passes through a third intaglio unit consisting of an impression cylinder 23, an etched cylinder 24 rotating in a color bath 25, and a doctor blade 26. The cylinder 24 is similar to the cylinder 16 and the liquid medium in the color bath is an adhesive which will effect lamination of the under side of the metal foil 19 with the top side of a web 27 of transparent rubber. The adhesive is contained in the solvent and excess adhesive is removed from the cylinder 24 by the doctor blade 26 so that the under surface of the metal foil is provided with an even overall coating of the adhesive. This adhesive may be a rubber solution or a suitable gum solution which will wet the metal and rubber hydrochloride web. After application of the rubber adhesive the composite web is brought in contact with the transparent web of hydrochloride between the rollers 28 and 29. The web 27 is taken from the roll 30 which, like the roll 22, is located in the same integral machine. The composite web consisting of the upper layer of cellulose acetate, the intermediate layer of metallic foil, and the lower layer of rubber hydrochloride is wound into a roll 31.

As will be seen from Figs. 2 and 3, the decoration and lamination as shown in Fig. 1 is carried out in such a manner that the upper transparent cellulose acetate web 10 has a marginal portion which extends beyond the metal foil. Likewise, the transparent rubber hydrochloride web 27 is laminated to the under side of the metal foil in such a manner that a marginal portion of the rubber hydrochloride extends beyond the metal foil and the cellulose acetate on the side of the metal foil opposite the cellulose acetate extension.

The roll 31 is unwound and cut transversely into tube blanks, the distance between cuts approximating the height of the tube to be formed. The design deposited on the under side of the cellulose acetate web covers approximately one-half the width of the tube blanks. Where it is desired that a composite design appear on each half of the finished tube the design is printed so that each unitary or composite design occupies one-fourth of the container blank, the designs being arranged, as shown in Fig. 2, adjacent the marginal extension of the cellulose acetate. The two designs "tooth paste" and "directions for use" then occupy approximately one-half of the web. The composite web consists of a series of these designs printed as shown and the web is cut between adjacent designs to provide tube blanks.

Each blank cut from the composite web is wound about itself in tube shape with the web of rubber material constituting the inner layer. It is preferred to wind the web in such a manner as to provide approximately two convolutions of the composite material. After the material is in tube form the web of rubber hydrochloride will constitute the inner surface of the tube and the extension of the rubber web overlie the laminated portion thereof. The web of rubber hydrochloride is sealed to its end extension to provide a continuous inner surface through which materials cannot escape.

The cellulose acetate web constitutes the outer layer of the tube and the half of the blank which contains the design extends completely about the tube, as will be seen from Fig. 5. The outer layer of cellulose acetate then is sealed to its end extension to complete the formation of the tube.

It is possible to seal the inner rubber layer to its extension by the use of heat and pressure. This method also may be employed to seal the outer cellulose acetate web to its extension. An integral seal of this sort is of value in preventing escape of moisture and the like and also prevents the composite tube from being unwound. Adhesive materials and solvents likewise may be employed to effect the seal between the materials.

The completed tube is assembled with a head 32 in any suitable manner. This head or closure member may be composed of various materials and the method of assembling the units may vary. In the drawing, the head is shown to be comprised of a compressible material having an inner flange 33 and an outer flange 34 spaced apart a distance sufficient to receive the tube and compressed together firmly to engage the tube so as to prevent its retraction. The tube is filled through its opposite end and sealed in a conventional manner.

The materials employed in the construction of the composite tube will depend upon the particular use for which it is designed. In a preferred embodiment of the invention the inner web will be composed of a rubber product of the type known as "Pliofilm," while the outer web will consist of cellulose acetate. Cellulose acetate is desirable since it is not affected by water and can be sealed to itself to provide a protective bond. The intermediate layer is shown to be of metal foil, since this material is impervious to moisture migration. When the tube is wound into two convolutions it is substantially completely impervious to the escape of moisture from the interior of the tube and is sufficiently strong to withstand the compression by which the contents of the tubes are forced out by the dispensing opening 35. In some cases it will be possible to employ a material such as waxed paper or the like as the intermediate lamina and other materials than those described may be composed for the inner and outer lamina. The printing in the design on the under side of the outer decorative layer provides a beautiful appearance and the design partakes of the surface gloss of the material upon which it is printed.

The tube of the present invention may be decorated with many colors and the quality of the printing possible in the method by which my tube is produced is greatly superior to that of printed tubes known heretofore. Furthermore, the printing is protected by reason of its being on the interior of the cellulose acetate layer. In some cases it will not be necessary to wind the web into two complete convolutions and the blanks may be smaller in size than as shown. It is preferred to employ a substantial overlap so as to provide a strong union between the convolutions.

As the blank is wound about itself into tube form an adhesive such as rubber cement or rubber latex may be applied between the convolutions so that the interior rubber layer is sealed throughout the overlapped portions to the exterior cellulose acetate layer. The tube thereby is formed into an integral body with each layer adhesively secured to the next adjacent layer.

After filling the tube with a material such as tooth paste it is preferred to clamp the open end with the joint of the overlapped portions occurring at about the center of the closure portion, as shown in Fig. 5. This prevents the tube from tending to open up along the cellulose acetate seal.

It will be recognized that many changes may be made in the invention as described herein without departing from the scope thereof. Such changes are intended to be included in the appended claims.

I claim:

1. The process of making a tube which comprises laminating to the under side of an intermediate web a web of rubber material having a marginal adhesive portion extending therebeyond, laminating to the upper side of said intermediate web an outer web of decorative material having an opposite marginal adhesive extension, winding the composite web about itself in tube form with said rubber web constituting the inner layer thereof, heat sealing said rubber web to its extension, and heat sealing said decorative web to its extension.

2. The process of making a tube which comprises printing the under side of a sheet of transparent cellulose sheeting, laminating the printed side of said sheeting to the upper side of a web of metal foil with said sheeting having a marginal adhesive portion extending beyond said foil, laminating to the under side of said foil a web of rubber material having an opposite marginal adhesive portion extending beyond said foil, winding the composite web about itself into tube form with said rubber material forming the inner layer, heat sealing said rubber material to its marginal portion, and heat sealing said cellulose material to its marginal portion.

3. The process of making a tube which comprises decorating a first web of cellulose acetate, laminating said web to a web of foil to provide an end extension, laminating the opposite side of said foil to a second web of rubber hydrochloride to provide an opposite end extension, winding the resulting composite web about itself into tube form with said second web constituting the inner layer, pressure sealing said second web to its end extension, and pressure sealing said first web to its end extension.

4. The process of making a tube which comprises decorating the under side of a web of transparent material, laminating the decorated side of said web to one side of a layer of foil so as to provide a marginal adhesive extension on said web, laminating the other side of said foil to an inner web having an opposite marginal adhesive extension, winding the resulting composite web about itself to provide a tube having approximately two layers of said composite web and with said inner web constituting the inner layer thereof, heat sealing said inner web to its extension, and heat sealing said outer web to its extension.

5. The process of making blanks for containers which comprises providing a series of designs on one section of the under side of a web of transparent material, laminating said side to one side of a web of foil to provide an adhesive end extension adjacent said design, laminating the other side of said foil to an inner web having an opposite marginal adhesive extension, and cutting the resulting composite web transversely between adjacent designs to form blanks having opposite marginal extensions.

6. A dispensing tube, comprising a composite web form of an inner sheet of rubber hydrochloride material, an intermediate sheet of foil, and an outer sheet of interiorly decorated transparent cellulose acetate material, said composite web being wound into tube form with substantial overlap and the overlapped portions being adhesively secured together.

7. A dispensing tube, comprising an intermediate layer of metallic foil, an inner layer of rubber material having an adhesive end extension and an outer layer of interiorly decorated transparent cellulose sheeting having an opposite adhesive end extension, said composite web being wound into tube form with a substantial overlapping portion adhesively sealed together, the sheet of rubber material being heat sealed to its extension, and the sheet of transparent cellulose material being heat sealed to its end extension.

8. A dispensing tube, comprising an intermediate protective sheet, an inner sealing sheet having an adhesive end extension, and an outer transparent cellulose sheet having a design printed on a portion thereof, said composite sheet being adhesively secured into tube form and in overlapping relation up to said design.

9. A tube, comprising a laminated composite web having an inner sheet of rubber hydrochloride provided with an inner edge extension and an outer sheet of a different preformed material provided with an oppositely positioned outer adhesive edge extension, said composite web being wound into tubular form with substantial overlap constituting at least about two convolutions, said outer edge extension being thermally sealed to said outer sheet, said inner edge extension being thermally sealed to said inner sheet to provide an integral inner seal, and unlaminated sides of said inner sheet and said outer sheet being adhered together between convolutions.

10. A tube, comprising a convoluted composite web having an outer protective and decorative sheet with a marginal adhesive end extension thermally sealed to itself and laminated to an inner sheet of rubber hydrochloride, said inner sheet having an edge extension thermally sealed to it to provide an integral internal seal, and unlaminated sides of said inner and outer sheets being adhered together between the convoluted portions.

IRVING GURWICK.